US010632790B2

(12) United States Patent
Kon et al.

(10) Patent No.: US 10,632,790 B2
(45) Date of Patent: Apr. 28, 2020

(54) PNEUMATIC TIRE

(71) Applicant: BRIDGESTONE CORPORATION, Tokyo (JP)

(72) Inventors: Seiji Kon, Tokyo (JP); Yoshihide Kouno, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 353 days.

(21) Appl. No.: 15/509,924

(22) PCT Filed: Aug. 21, 2015

(86) PCT No.: PCT/JP2015/073590
§ 371 (c)(1),
(2) Date: Mar. 9, 2017

(87) PCT Pub. No.: WO2016/039121
PCT Pub. Date: Mar. 17, 2016

(65) Prior Publication Data
US 2017/0274705 A1  Sep. 28, 2017

(30) Foreign Application Priority Data
Sep. 12, 2014  (JP) .................................. 2014-187024

(51) Int. Cl.
B60C 19/00 (2006.01)
B60C 13/02 (2006.01)
(Continued)

(52) U.S. Cl.
CPC ............... B60C 5/01 (2013.01); B60C 13/02 (2013.01); B60C 19/002 (2013.01); B60C 9/22 (2013.01);
(Continued)

(58) Field of Classification Search
CPC ..... B60C 1/0041; B60C 5/007; B60C 19/002; B60C 19/003; B60C 2013/026; B60C 5/01
See application file for complete search history.

(56) References Cited

U.S. PATENT DOCUMENTS 4,392,522 A   7/1983  Bschorr
4,399,851 A   8/1983  Bschorr
(Continued)

FOREIGN PATENT DOCUMENTS

CN  102950974 A   3/2013
CN  203427544 U   2/2014
(Continued)

OTHER PUBLICATIONS

International Search Report for PCT/JP2015/073590 dated Oct. 27, 2015 [PCT/ISA/210].
(Continued)

Primary Examiner — Robert C Dye
Assistant Examiner — Asha A Thomas
(74) Attorney, Agent, or Firm — Sughrue Mion, PLLC

(57) ABSTRACT

A pneumatic tire is configured by a resin tire frame member. An inner face of the tire frame member is provided with an attachment section. The attachment section is configured so as to attach a sound-absorbing material inside the tire frame member. The sound-absorbing material employs, for example, a spongey material, and the sound-absorbing material is capable of absorbing sound.

5 Claims, 7 Drawing Sheets

(51) Int. Cl.
  *B60C 5/01*   (2006.01)
  *B60C 7/00*   (2006.01)
  *B60C 9/22*   (2006.01)
  *B60C 13/00*  (2006.01)
  *B60C 13/04*  (2006.01)

(52) U.S. Cl.
  CPC .. *B60C 2007/005* (2013.01); *B60C 2013/005* (2013.01); *B60C 2013/026* (2013.01); *B60C 2013/045* (2013.01)

(56) References Cited

U.S. PATENT DOCUMENTS

| | | | |
|---|---|---|---|
| 4,664,168 A * | 5/1987 | Hong | B29D 30/0685 152/504 |
| 6,244,314 B1 | 6/2001 | Dodt et al. | |
| 6,343,843 B1 | 2/2002 | Nishikawa | |
| 6,422,655 B1 | 7/2002 | Britton et al. | |
| 6,598,636 B1 | 7/2003 | Schürmann et al. | |
| 6,648,421 B1 | 11/2003 | Akiyoshi et al. | |
| 6,715,842 B1 | 4/2004 | Bopp et al. | |
| 2001/0006084 A1 | 7/2001 | Yukawa et al. | |
| 2001/0007268 A1 | 7/2001 | Yukawa et al. | |
| 2002/0033215 A1 | 3/2002 | Aoki | |
| 2002/0059971 A1 | 5/2002 | Yukawa et al. | |
| 2003/0020320 A1 | 1/2003 | Yukawa et al. | |
| 2004/0066083 A1 | 4/2004 | Tsihlas | |
| 2005/0098251 A1 | 5/2005 | Yukawa | |
| 2005/0155686 A1 | 7/2005 | Yukawa et al. | |
| 2005/0161138 A1 | 7/2005 | Yukawa et al. | |
| 2005/0205183 A1 | 9/2005 | Yukawa | |
| 2007/0175559 A1 | 8/2007 | Tanno et al. | |
| 2009/0139620 A1 | 6/2009 | Ikeda et al. | |
| 2009/0173422 A1 | 7/2009 | Utsumi et al. | |
| 2009/0308523 A1 | 12/2009 | Kuramori | |
| 2012/0152428 A1 * | 6/2012 | Kouno | B29D 30/1628 152/526 |
| 2016/0001602 A1 | 1/2016 | Hasegawa et al. | |

FOREIGN PATENT DOCUMENTS

| | | |
|---|---|---|
| EP | 0029120 A1 | 5/1981 |
| EP | 0367556 A2 | 5/1990 |
| EP | 0 425 299 A2 | 5/1991 |
| EP | 0911185 A2 | 4/1999 |
| EP | 0956980 A2 | 11/1999 |
| JP | S56-167505 A | 12/1981 |
| JP | S62-216803 A | 9/1987 |
| JP | S63-154410 A | 6/1988 |
| JP | S63-275404 A | 11/1988 |
| JP | S63-291708 A | 11/1988 |
| JP | S63-291709 A | 11/1988 |
| JP | S64-078902 A | 3/1989 |
| JP | H01-254411 A | 10/1989 |
| JP | H02-041803 U | 3/1990 |
| JP | H02-127101 A | 5/1990 |
| JP | 03-143701 A | 6/1991 |
| JP | H04-159101 A | 6/1992 |
| JP | H06-106903 A | 4/1994 |
| JP | H06-053211 U | 7/1994 |
| JP | H07-052616 A | 2/1995 |
| JP | H08-132816 A | 5/1996 |
| JP | H09-086114 A | 3/1997 |
| JP | H10-106902 A | 4/1998 |
| JP | 2000-127709 A | 5/2000 |
| JP | 2001-047809 A | 2/2001 |
| JP | 2001-113902 A | 4/2001 |
| JP | 2001-180214 A | 7/2001 |
| JP | 2001-180216 A | 7/2001 |
| JP | 2001-180217 A | 7/2001 |
| JP | 2001-180218 A | 7/2001 |
| JP | 2001-180219 A | 7/2001 |
| JP | 2001-187502 A | 7/2001 |
| JP | 2001-187507 A | 7/2001 |
| JP | 2001-187508 A | 7/2001 |
| JP | 2001-239804 A | 9/2001 |
| JP | 2001-347806 A | 12/2001 |
| JP | 2001-347807 A | 12/2001 |
| JP | 2002-067608 A | 3/2002 |
| JP | 2002-120509 A | 4/2002 |
| JP | 2002-144809 A | 5/2002 |
| JP | 2002-512913 A | 5/2002 |
| JP | 2002-178712 A | 6/2002 |
| JP | 2002-539008 A | 11/2002 |
| JP | 2003-048407 A | 2/2003 |
| JP | 2003-063208 A | 3/2003 |
| JP | 2003-146005 A | 5/2003 |
| JP | 2003-226104 A | 8/2003 |
| JP | 2003-252003 A | 9/2003 |
| JP | 2003-285607 A | 10/2003 |
| JP | 2004-082787 A | 3/2004 |
| JP | 2004-082837 A | 3/2004 |
| JP | 2004-090725 A | 3/2004 |
| JP | 2004-090727 A | 3/2004 |
| JP | 2004-148865 A | 5/2004 |
| JP | 2004-168212 A | 6/2004 |
| JP | 2004-216943 A | 8/2004 |
| JP | 2004-524215 A | 8/2004 |
| JP | 2004-276809 A | 10/2004 |
| JP | 2004-291855 A | 10/2004 |
| JP | 2004-291905 A | 10/2004 |
| JP | 2004-306653 A | 11/2004 |
| JP | 2004-306660 A | 11/2004 |
| JP | 2004-306673 A | 11/2004 |
| JP | 2004-306715 A | 11/2004 |
| JP | 2004-306760 A | 11/2004 |
| JP | 2005-001428 A | 1/2005 |
| JP | 2005-028897 A | 2/2005 |
| JP | 2005-053319 A | 3/2005 |
| JP | 2005-075206 A | 3/2005 |
| JP | 2005-075207 A | 3/2005 |
| JP | 2005-104314 A | 4/2005 |
| JP | 2005-138760 A | 6/2005 |
| JP | 2005-200017 A | 7/2005 |
| JP | 2005-205935 A | 8/2005 |
| JP | 2005-205937 A | 8/2005 |
| JP | 2005-212524 A | 8/2005 |
| JP | 2005-212577 A | 8/2005 |
| JP | 2005-219592 A | 8/2005 |
| JP | 2005-219593 A | 8/2005 |
| JP | 2005-238888 A | 9/2005 |
| JP | 2005-254924 A | 9/2005 |
| JP | 2005-255015 A | 9/2005 |
| JP | 2005-255162 A | 9/2005 |
| JP | 2005-262920 A | 9/2005 |
| JP | 2005-262921 A | 9/2005 |
| JP | 2007-161031 A | 6/2007 |
| JP | 2009-298120 A | 12/2009 |
| JP | 2011-255684 A | 12/2011 |
| JP | 2013010239 A * | 1/2013 |
| JP | 2014-151875 A | 8/2014 |
| JP | 2015-020731 A | 2/2015 |
| KR | 10-2009-0010938 A | 1/2009 |
| WO | 2014-129380 A1 | 8/1917 |
| WO | 00/78562 A1 | 12/2000 |
| WO | 02/20286 A1 | 3/2002 |
| WO | 2002-307905 A | 10/2002 |
| WO | 03/103989 A | 12/2003 |

OTHER PUBLICATIONS

Written Opinion for PCT/JP2015/073590 dated Oct. 27, 2015 [PCT/ISA/237].
Communication dated Aug. 9, 2017 issued by the European Patent Office in counterpart application No. 15840294.1.
Communication dated Sep. 11, 2018 from the State Intellectual Property Office of the P.R.C. in counterpart Application No. 2015800488662.

(56) References Cited

OTHER PUBLICATIONS

Communication dated Dec. 4, 2017 from the State Intellectual Property Office of the P.R.C. in counterpart Application No. 2015800488662.

* cited by examiner

PNEUMATIC TIRE

CROSS REFERENCE TO RELATED APPLICATIONS

This application is a National Stage of International Application No. PCT/JP2015/073590 filed Aug. 21, 2015, claiming priority based on Japanese Patent Application No. 2014-187024 filed Sep. 12, 2014, the contents of all of which are incorporated herein by reference in their entirety.

TECHNICAL FIELD

The present invention relates to a pneumatic tire.

BACKGROUND ART

Patent Document 1 below describes a resin pneumatic tire in which a tire frame member is formed from a resin material, and a rubber tread is provided at an outer circumferential surface of the tire frame member.

Patent Document 1: Japanese Patent Application Laid-Open (JP-A) No. H03-143701

SUMMARY OF INVENTION

Technical Problem

The resin pneumatic tire described above attempts to reduce cavity resonance noise by suppressing vibration of internal air caused by unevenness of a road surface during vehicle travel. A sound-absorbing material is preferably employed for cavity resonance noise reduction. However, some ingenuity has been required to use sound-absorbing materials.

In consideration of the above circumstances, an object of the present invention is to obtain a resin pneumatic tire enabling simple attachment of a sound-absorbing material.

Solution to Problem

A pneumatic tire according to a first aspect of the present invention includes a tire frame member that is made from a resin, and an attachment section that is provided at an inner face of the tire frame member, and configured such that a sound-absorbing material capable of absorbing sound is attachable to the attachment section.

In the pneumatic tire according to the first aspect, the tire frame member is made of a resin. The attachment section is provided at an inner face of the tire frame member.

By providing the attachment section, a sound-absorbing material capable of absorbing sound can be easily attached inside the tire frame member. By attaching the sound-absorbing material inside the tire frame member, cavity resonance noise can accordingly be reduced by the sound-absorbing material.

A pneumatic tire according to a second aspect of the present invention is the pneumatic tire according to the first aspect, wherein the attachment section is configured by plural projecting walls that respectively project out from an inner circumferential surface of the tire frame member toward a tire radial direction inner side, and that are separated from each other in a tire width direction. A dimension between the projecting walls is greater than a projection height dimension of the projecting walls.

In the pneumatic tire according to the second aspect, the attachment section is configured by the plural projecting walls. The respective projecting walls project out from the inner circumferential surface of the tire frame member toward the tire radial direction inner side, and are separated from each other in the tire width direction. The dimension between the projecting walls is greater than the projection height dimension of the projecting walls. In other words, the projection height of the projecting walls from the inner circumferential surface of the tire frame member is low. Thus, for example, in an operation to fit the pneumatic tire to a wheel, or in an operation to replace the pneumatic tire, contact between a tire lever and the attachment section or the sound-absorbing material can be avoided, enabling damage to the attachment section or the sound-absorbing material to be suppressed.

A pneumatic tire according to a third aspect of the present invention is the pneumatic tire according to the first aspect, wherein the attachment section is configured by a projecting wall projecting out from a side wall portion of the tire frame member toward a tire width direction inner side.

In the pneumatic tire according to the third aspect, the attachment section is configured by the projecting wall that projects out from the side wall portion of the tire frame member toward the tire width direction inner side. Accordingly, the projection direction of the projecting walls is the same as the extension direction of the crown portion of the tire frame member. The removal direction from a resin-molding mold when molding the tire frame member is therefore the same direction for both the crown portion and the attachment section, thereby enabling the attachment section to be integrally molded at the same time as the tire frame member is molded.

A pneumatic tire according to a fourth aspect of the present invention is the pneumatic tire according to any one of the first aspect to the third aspect, wherein a sound-absorbing material capable of absorbing sound is attached to the attachment section.

In the pneumatic tire according to the fourth aspect, the sound-absorbing material is attached to the attachment section, thereby enabling cavity resonance noise to be reduced by the sound-absorbing material.

A pneumatic tire according to a fifth aspect of the present invention is the pneumatic tire according to the second aspect, wherein a sound-absorbing material that has a greater width dimension than the dimension between the projecting walls, that has a belt shape, and that is capable of absorbing sound, is slotted between the projecting walls.

In the pneumatic tire according to the fifth aspect, the belt shaped sound-absorbing material is slotted between the projecting walls. The width dimension of the sound-absorbing material is greater than the dimension between the projecting walls. Accordingly, the sound-absorbing material can be easily slotted between the projecting walls owing to the recovery force of the sound-absorbing material after compressing (squeezing) the sound-absorbing material in the width direction.

A pneumatic tire according to a sixth aspect of the present invention is the pneumatic tire according to the first aspect, wherein the attachment section is configured by a recess sunken toward a tire radial direction outer side at an inner circumferential surface of the tire frame member. A width dimension of the recess in a tire width direction is greater than a depth dimension of the recess.

In the pneumatic tire according to the sixth aspect, the attachment section is configured by a recess sunken toward the tire radial direction outer side in the inner circumferential surface of the tire frame member. The width dimension of the recess in the tire width direction is greater than the depth dimension of the recess. In other words, the depth of the recess is shallow. Accordingly, for example, in an operation to fit the pneumatic tire to a wheel, or in an operation to replace the pneumatic tire, contact between a tire lever and the attachment section or the sound-absorbing material can be avoided, enabling damage to the attachment section or the sound-absorbing material to be suppressed.

A pneumatic tire according to a seventh aspect of the present invention is the pneumatic tire of the sixth aspect, wherein a sound-absorbing material that has a greater width dimension than the width dimension of the recess, that has a belt shape, and that is capable of absorbing sound, is slotted into the recess.

In the pneumatic tire according to the seventh aspect, the belt shaped sound-absorbing material is slotted into the recess serving as the attachment section. The width dimension of the sound-absorbing material is greater than the width dimension of the recess. Accordingly, the sound-absorbing material can be easily slotted into the recess owing to the recovery force of the sound-absorbing material after compressing (squeezing) the sound-absorbing material in the width direction.

A pneumatic tire according to an eighth aspect of the present invention is the pneumatic tire according to any one of the first aspect to the seventh aspect, wherein the attachment section is integrally molded to the tire frame member.

In the pneumatic tire according to the eighth aspect, the attachment section is integrally molded to the tire frame member, thereby enabling a reduction in the number of components, and enabling configuration with a simple structure.

Advantageous Effects of Invention

The present invention has the excellent advantageous effect that a resin pneumatic tire enabling simple attachment of a sound-absorbing material can be obtained.

DESCRIPTION OF EMBODIMENTS

Figure 1:
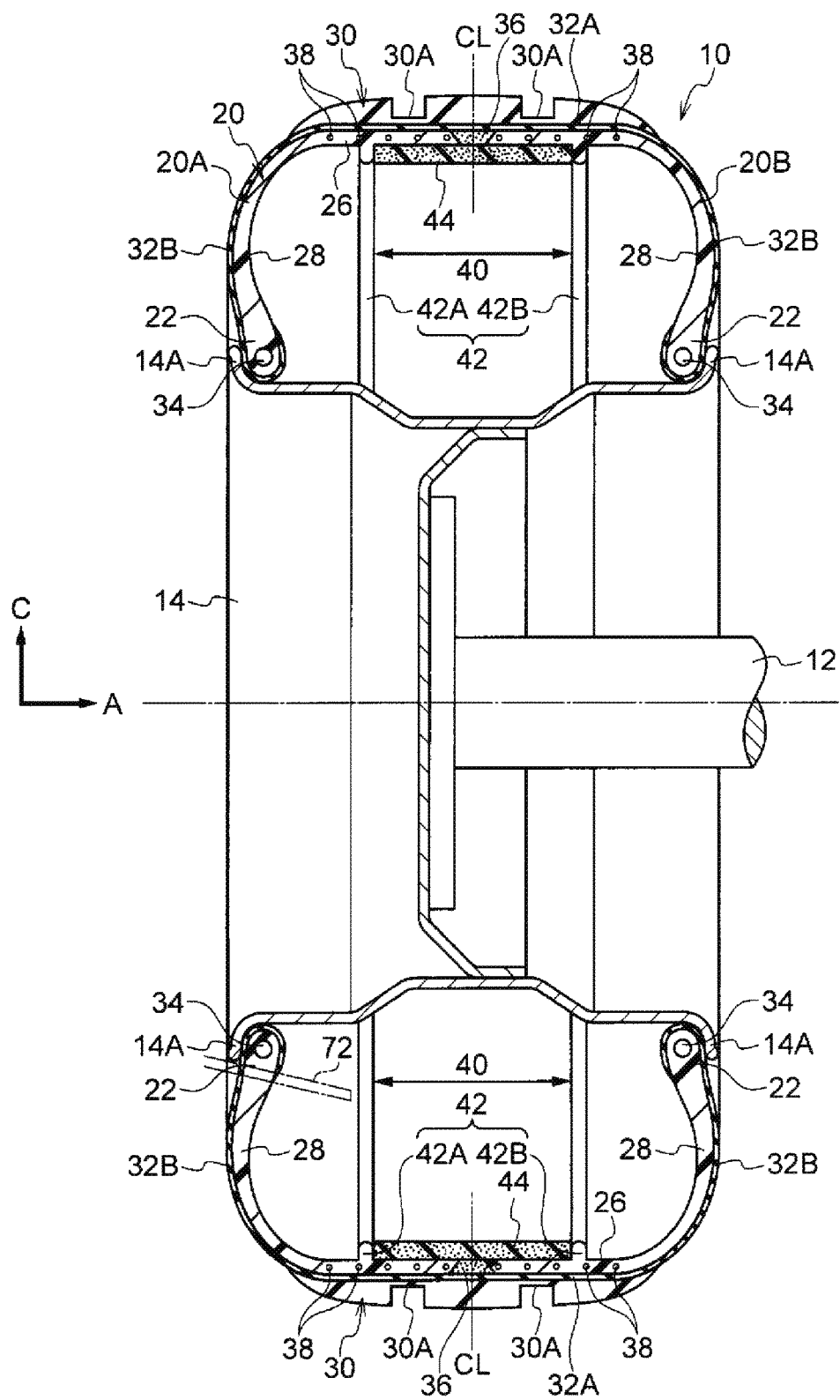
FIG. 1 is a cross-section as viewed along a radial direction, illustrating overall configuration of a pneumatic tire according to a first exemplary embodiment of the present invention.

Explanation follows regarding a pneumatic tire according to exemplary embodiments of the present invention, with reference to FIG. 1 to FIG. 7. Note that in the drawings, the letter A indicates a tire axial direction as appropriate. The tire axial direction A corresponds to a vehicle width direction of a vehicle fitted with the pneumatic tire. The letter C indicates a tire radial direction.

First Exemplary Embodiment

Figure 2:
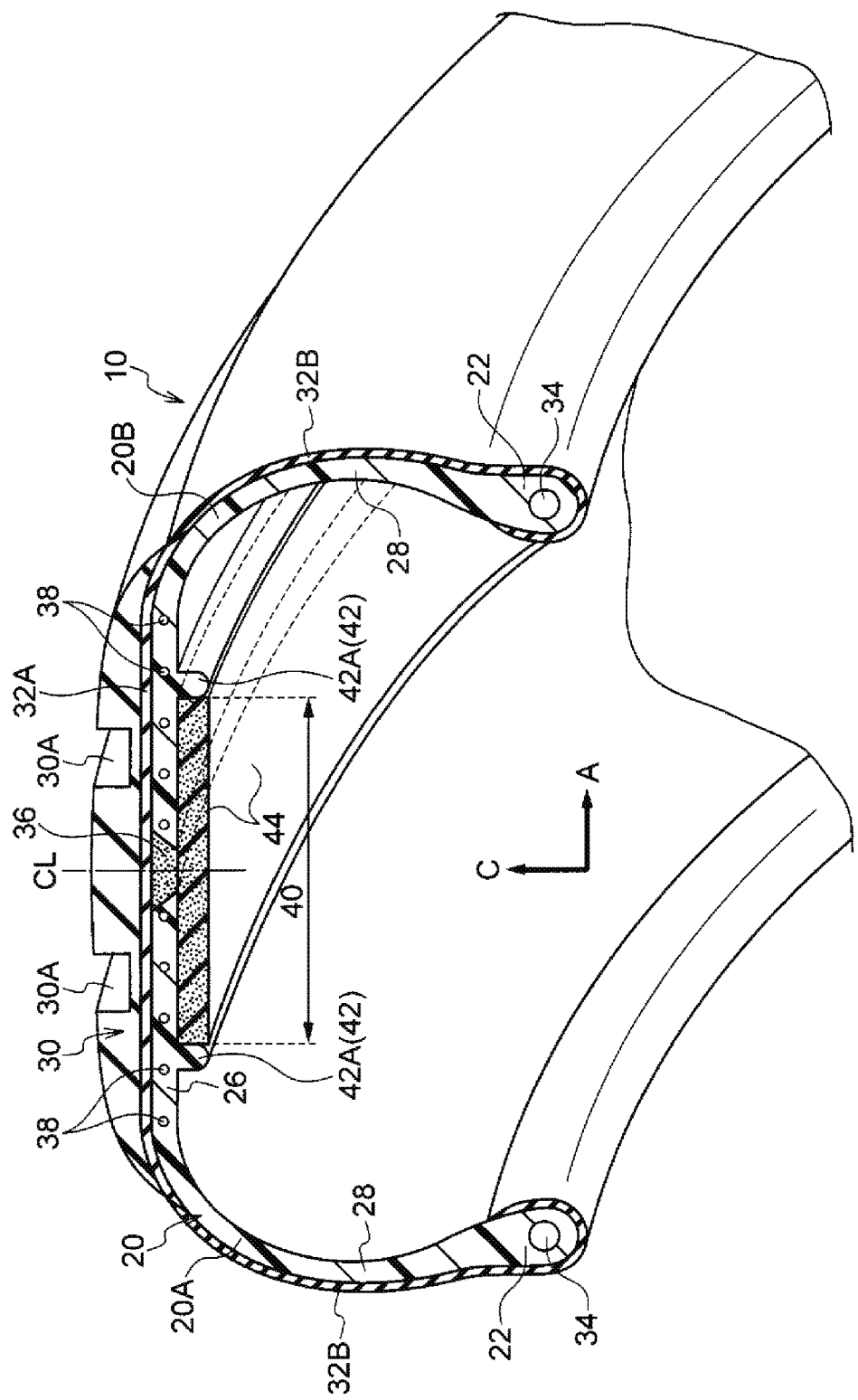
FIG. 2 is an enlarged perspective view illustrating an upper side cross-section portion of the pneumatic tire illustrated in FIG. 1.
Figure 3:
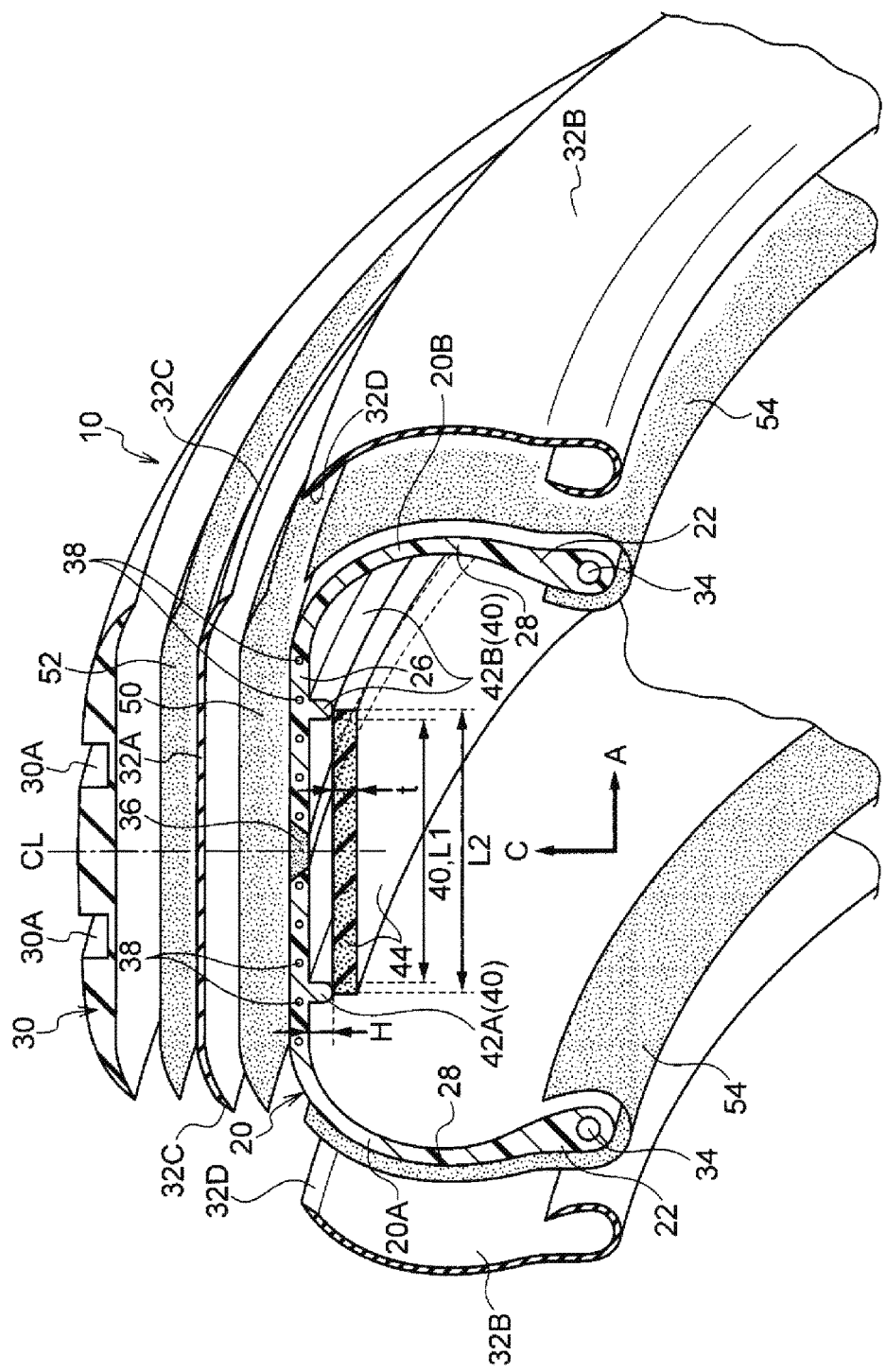
FIG. 3 is an exploded perspective view of the pneumatic tire illustrated in FIG. 2.

Explanation follows regarding a pneumatic tire according to the first exemplary embodiment of the present invention, with reference to FIG. 1 to FIG. 3. As illustrated in FIG. 1, a pneumatic tire 10 according to the present exemplary embodiment is assembled to rims 14A of a wheel 14 attached to an end portion of an axle 12 of a vehicle, not illustrated in the drawings. The pneumatic tire 10 includes a resin tire frame member 20 having a toroidal shape spanning between one bead portion 22 on the vehicle width direction outer side of the pneumatic tire 10, and another bead portion 22 on the vehicle width direction inner side of the pneumatic tire 10. A tread layer 30 is provided at an outer circumferential surface of the tire frame member 20. Side covering layers 32B are provided at outside faces of the tire frame member 20. Moreover, the pneumatic tire 10 is provided with an attachment section 42 at an inner circumferential surface of the tire frame member 20. The attachment section 42 partitions off an attachment region 40, and a sound-absorbing material 44 that is capable of absorbing sound is attached to the attachment region 40 using the attachment section 42.

Tire Frame Member Configuration

As illustrated in FIG. 1 to FIG. 3, the tire frame member 20 of the present exemplary embodiment is molded by injection molding a resin material. More specifically, the structure of tire frame member 20 includes a crown portion 26, side wall portions 28, and the bead portions 22. The crown portion 26 is provided at the outer circumferential surface of the tire frame member 20. The side wall portions 28 respectively extend from both tire axial direction edges of the crown portion 26 toward the tire radial direction inner side, and are formed integrally to the crown portion 26. The bead portions 22 are respectively provided at the tire radial direction inner side of the respective side wall portions 28, and are formed integrally to the respective side wall portions 28.

A bead core 34 is embedded in each of the bead portions 22. The bead cores 34 may employ metal bead cores, organic fiber bead cores, resin bead cores in which an organic fiber material is covered by a resin material, hard resin bead cores, or the like. Note that the bead cores 34 may be omitted in cases in which the rigidity of the bead portions 22 is secured and the bead portions 22 are fitted to the rims 14A of the wheel 14 in an appropriate manner (see FIG. 1).

Resin materials such as a thermoplastic resin having rubber-like elasticity, a thermoplastic elastomer (TPE), or a thermosetting resin may be employed as resin materials. A thermoplastic elastomer is well-suited as the resin material in consideration of its elasticity during travel and its molding properties during manufacture.

Thermoplastic amide-based elastomers (TPA), thermoplastic ester-based elastomers (TPC), thermoplastic olefin-based elastomers (TPO), thermoplastic styrene-based elastomers (TPS), thermoplastic urethane-based elastomers (TPU), thermoplastic cross-linked rubbers (TPV), or other thermoplastic elastomers (TPZ), and the like, as defined in JIS K6418 (Japan Industrial Standards), may be employed as thermoplastic elastomers.

Moreover, in cases in which a thermoplastic resin is employed as the resin material, urethane resins, olefin resins, vinyl chloride resins, polyamide resins and the like may be employed as the thermoplastic resin. More specifically, a thermoplastic resin having the characteristics of a deflection temperature under load (when loaded at 0.45 MPa) as defined by ISO (International Organization for Standardization) 75-2 or ASTM (American Association for Testing Materials) D648 of 78° C. or greater, a tensile yield strength, tensile yield elongation, and tensile elongation at break, as defined by JIS K7113, of 10 MPa or greater, 10% or greater, and 50% or greater respectively, and with a Vicat softening temperature, as defined by JIS K7206 (method A), of 130° C. or greater, is well-suited for use.

In the present exemplary embodiment, the tire frame member 20 includes half-frame members 20A, 20B molded as left-right halves symmetrical about a tire width direction central portion, namely about a tire equatorial plane CL or a plane in the vicinity thereof, of the pneumatic tire 10. Tire width direction center side edges of the crown portions 26 of the respective half-frame members 20A, 20B are bonded together to configure the tire frame member 20. A bonding material 36 is employed in bonding. A welding method in which a resin material of the same type or a different type to that of the tire frame member 20 is employed as the bonding material 36 may be employed when bonding. Moreover, a hot-plate welding method in which a hot plate is inserted between edges of the crown portion 26, and the hot plate is removed whilst pressing the edges in directions toward each other to bond together the edges that are in a molten state, may also be employed when bonding. In such cases, resin material that has melted and then hardened configures the bonding material 36. Moreover, an adhesive may be employed for some of the bonding material 36 in combination with the welding method or the hot-plate welding method described above.

A reinforcing cord 38 is provided wound around the crown portion 26 in a spiral shape, for example. A steel cord, a monofilament (single strand) formed from a metal fiber or an organic fiber, or a multifilament (twisted strands) configured by twisting such fibers together, may be employed as the cord 38. When a steel cord is employed, sheet shaped thermoplastic resin material is adhered to a tire radial direction outer side of the crown portion 26, and the steel cord is embedded in the thermoplastic resin material while being heated. Note that the thermoplastic resin material may be heated as well as heating the steel cord.

Providing the cord 38 to the crown portion 26 enables the tire circumferential direction rigidity of the crown portion 26 to be improved, and also enables the fracture resistance of the crown portion 26 to be improved. This also enables the puncture resistance of the crown portion 26 of the pneumatic tire 10 to be raised. Note that the cord 38 may be provided intermittently in the tire width direction. Moreover, further reinforcing material may be provided to at least one location out of the bead portions 22, the crown portion 26, and the side wall portions 28 of the tire frame member 20 in order to reinforce the tire frame member 20. Practically, a polymer material, a metal fiber material, a cord material, a nonwoven fabric material, a woven fabric material, or the like may be employed as a reinforcing material.

Tread Layer Configuration

The tread layer 30 is provided at an outer circumferential surface of the tire frame member 20, with cushioning rubber 32A interposed therebetween. In the present exemplary embodiment, rubber similar to that employed in the tread rubber of general rubber pneumatic tires, or similar to the tread rubber employed in recycled tires, is employed for the tread layer 30. Moreover, the cushioning rubber 32A may employ cushioning rubber similar to cushioning rubber in precured (cold) recycled tires adhered with vulcanized rubber molded with a tread face in advance. Note that the tread face of the tread layer 30 is formed with water-repelling grooves 30A, similarly to a general rubber pneumatic tire. Moreover, the tread pattern of the tread layer 30 is not particularly limited, and a known tread pattern may be employed.

Side Covering Layer Configuration

The side covering layers 32B are formed from rubber similar to rubber employed in the side wall portions and bead portions of general rubber pneumatic tires. In the present exemplary embodiment, the respective side covering layers 32B are formed continuously from both tire width direction edges of the tread layer 30 along outer faces of the side wall portions 28, outer faces of the bead portions 22, and inner faces of the bead portions 22.

The thickness of the side covering layers 32B is set to substantially the same thickness as that of the cushioning rubber 32A. Moreover, as illustrated in FIG. 3, an edge on the cushioning rubber 32A side of each side covering layer 32B is provided with a tapering-shaped bonding portion 32D, and edges of the cushioning rubber 32A on the side covering layer 32B sides are provided with tapering-shaped bonding portions 32C. The tapering shape increases the bonding surface area over which the bonding portion 32C and the bonding portion 32D are bonded together.

In the pneumatic tire 10 of the present exemplary embodiment, the entire outer face of the tire frame member 20 is completely covered by the cushioning rubber 32A and the side covering layers 32B, namely is completely covered by vulcanized rubber.

Attachment Section Configuration

As illustrated in FIG. 1 to FIG. 3, in the present exemplary embodiment, the attachment section 42 is configured by a pair of (plural) projecting walls: a first projecting wall 42A and a second projecting wall 42B that respectively project out from the inner circumferential surface of the tire frame member 20 toward the tire radial direction inner side, and that are separated from each other in the tire width direction.

More specifically, the first projecting wall 42A is disposed toward the vehicle width direction outer side, and is provided around the entire circumferential direction of the tire frame member 20 in an annular shape as viewed along the tire axial direction. The cross-section profile of the first projecting wall 42A is configured in a U-shape as viewed along a radial direction. The first projecting wall 42A is molded integrally to the tire frame member 20, and is made from a resin, similarly to the tire frame member 20. The second projecting wall 42B is disposed toward the vehicle width direction inner side, and is similarly provided around the entire circumferential direction of the tire frame member 20 in an annular shape as viewed along the tire axial direction. Similarly to the first projecting wall 42A, the second projecting wall 42B is configured with a U-shaped cross-section profile, is molded integrally to the tire frame member 20, and is made from a resin. Note that the cross-section profiles of the first projecting wall 42A and the second projecting wall 42B are not limited to U-shapes, and may be configured in semicircular shapes, half-elliptical shapes, polygonal shapes, trapezoidal shapes, or the like. Moreover, the first projecting wall 42A and the second projecting wall 42B may be provided intermittently around the circumferential direction. Moreover, the intermittence pitch of the first projecting wall 42A (the spacing at which the continuity is interrupted) may be different to the intermittence pitch of the second projecting wall 42B. Moreover, configuration may be made in which either one out of the first projecting wall 42A or the second projecting wall 42B is provided continuously, and the other is provided intermittently.

As illustrated in FIG. 3, in the present exemplary embodiment, the first projecting wall 42A and the second projecting wall 42B each have the same projection height H from the inner circumferential surface of the tire frame member 20. For example, the projection height H is from 10 mm to 10 cm. The projection height H is set greater than the thickness of the crown portion 26. A separation dimension L1 between the first projecting wall 42A and the second projecting wall 42B (the distance between a wall face on the second projecting wall 42B side of the first projecting wall 42A and a wall face on the first projecting wall 42A side of the second projecting wall 42B) is exactly the same dimension as a width dimension of the attachment region 40, and is set greater than the projection height H. In other words, the projection height H of the first projecting wall 42A and the second projecting wall 42B is set low while allowing attachment of the sound-absorbing material 44. More preferably, the projecting wall height H is one quarter the height of the sound-absorbing material 44 or greater.

Sound-Absorbing Material Configuration

As illustrated in FIG. 1 to FIG. 3, the sound-absorbing material 44 is slotted between the first projecting wall 42A and the second projecting wall 42B of the attachment section 42 and attached to the attachment region 40 at the inner circumferential surface of the tire frame member 20. Namely, the sound-absorbing material 44 is attached to the attachment region 40 by the attachment section 42.

The sound-absorbing material 44 is configured in a belt shape or a tube shape, having a uniform width in the tire width direction, and with its length direction extending along the inner circumferential surface of the tire frame member 20. The sound-absorbing material 44 has a spongiform porous structure. What is referred to as a spongey material, obtained by foaming a material such as a rubber or a synthetic resin, is employed as the sound-absorbing material 44. More specifically, a resin material such as a thermoplastic resin, a thermoplastic elastomer (TPE), or a thermosetting resin may be employed as the resin material. In the present exemplary embodiment, the spongey material of the sound-absorbing material 44 may employ a closed-cell foam (independent cell foam) type or an open-cell foam type. Moreover, the spongey material may be integrally formed with at least one of an animal fiber, a plant fiber, or a synthetic fiber entangled with the above material. The sound-absorbing material 44 employed in the present exemplary embodiment effectively converts sound energy into heat energy, thereby damping sound. Moreover, the sound-absorbing material 44 has excellent vibration damping properties. Note that in the present exemplary embodiment, the sound-absorbing material 44 may include a material having excellent sound reflectivity, such as a glass wool material, a felt material, or a foamed rubber material.

Note that as illustrated in FIG. 3, a thickness t of the sound-absorbing material 44 is set to from 10 mm to 10 cm, and is configured to be equivalent to the projection height H of the first projecting wall 42A and the second projecting wall 42B, or to be thicker than the projection height H. Moreover, a width dimension L2 of the sound-absorbing material 44 in the tire width direction is set greater than the separation dimension L1 between the first projecting wall 42A and the second projecting wall 42B (the tire width direction dimension of the attachment region 40). Namely, the sound-absorbing material 44 is configured so as to be compressed (squeezed) in the tire width direction and slotted between the first projecting wall 42A and the second projecting wall 42B. Note that in the present exemplary embodiment, the sound-absorbing material 44 may be slotted into and also adhered to the attachment region 40 using an adhesive. In such cases, the sound-absorbing material 44 is firmly attached to the attachment region 40.

Note that in the pneumatic tire 10 according to the present exemplary embodiment, a release agent (inner face liquid layer) of silicone or the like that is employed during vulcanization is not applied to at least the attachment region 40. This is since the tire frame member 20 is made from a resin, and a bladder employed during vulcanization is generally made from butyl rubber, such that the bladder is not liable to stick to the inner circumferential surface of the tire frame member 20, rendering a release agent unnecessary. Moreover, a release agent is not necessary when the tread rubber side of the tire frame member is covered with an envelope to configure a temporary assembly and then vulcanized. A release agent is thus not necessary at the inner circumferential surface of the tire frame member 20. Accordingly, in the pneumatic tire 10, a release agent is not applied, enabling the attachment region 40 to be coated with an adhesive without requiring a process to remove release agent. Adhesive may therefore be employed during attachment of the sound-absorbing material 44 in addition to slotting in the sound-absorbing material 44.

Pneumatic Tire Manufacturing Method

Simple explanation follows regarding a manufacturing method of the pneumatic tire 10 according to the present exemplary embodiment with reference to FIG. 1 to FIG. 3.

First, the resin tire frame member 20 illustrated in FIG. 3, the tread layer 30 in a vulcanized or semi-vulcanized state, and the side covering layers 32B in a vulcanized or semi-vulcanized state are molded in advance. Note that the side covering layers 32B are molded in shapes corresponding to affixing locations on the tire frame member 20.

The unvulcanized rubber cushioning rubber 32A is disposed at the outer circumferential surface of the tire frame member 20, and the tread layer 30 is disposed at the tire radial direction outer side of the cushioning rubber 32A. The tread layer 30 is belt shaped, and the tread layer 30 is wrapped onto the outer circumference of the cushioning rubber 32A in an annular shape. Alternatively, the tread layer 30 may be formed in an annular shape in advance, and the tread layer 30 may be fitted onto the outer circumference of the cushioning rubber 32A. A tread pattern is provided on a front face of the tread layer 30.

Note that as illustrated in FIG. 3, the cushioning rubber 32A is adhered to the outer circumferential surface of the tire frame member 20 through an adhesive 50, and similarly, the tread layer 30 is adhered to the outer circumference of the cushioning rubber 32A through an adhesive 52. In the present exemplary embodiment, a triazine thiol-based adhesive is employed for the adhesives 50, 52. These adhesives are coated under an atmosphere of 70% humidity or lower. Alternatively, a chlorinated rubber-based adhesive, a phenol resin-based adhesive, an isocyanate-based adhesive, a halogenated rubber-based adhesive, or the like may be employed for the adhesives 50, 52.

The outer circumferential surface of the tire frame member 20 is buffed prior to coating with the adhesive 50, and similarly, the front face of the cushioning rubber 32A is buffed prior to coating with the adhesive 52. The buffing is processing to at least partially remove an outermost surface using sandpaper, a grinder, or the like. Buffing increases the adhesion force of the adhesive 50 to the outer circumferential surface of the tire frame member 20, and increases the adhesion force of the adhesive 52 to the front face of the cushioning rubber 32A. Moreover, after buffing, the outer circumferential surface of the tire frame member 20 and the front face of the cushioning rubber 32A are preferably respectively de-greased by washing with an alcohol solution or the like. Moreover, after buffing, the outer circumferential surface of the tire frame member 20 and the front face of the cushioning rubber 32A are preferably respectively subjected to surface modification such as corona discharge treatment or ultraviolet irradiation treatment. Such treatment enables the adhesion force to be increased.

A tacky material such as a rubber cement composition is preferably coated onto a back face of the tread layer 30 and/or the front face of the cushioning rubber 32A in advance. The tacky material can be used in a temporary fixing operation, enabling the task to be made easier. In cases in which styrene-butadiene rubber (SBR) is employed for the tread layer 30, an SBR-based splice cement is employed as the rubber cement composition. In cases in which an SBR-based rubber with a high natural rubber (NR) content is employed for the tread layer 30, an SBR-based splice cement containing butadiene rubber (BR) is employed as the rubber cement composition. Moreover, a solvent-free cement containing an elastomer in liquid form such as liquid BR or the like, a cement with a main component of a blend of isoprene rubber (IR) rubber and SBR, or the like may be employed as the rubber cement composition.

Next, as illustrated in FIG. 3, the side covering layers 32B are disposed at outside faces of the tire frame member 20 (outer faces of the side wall portions 28 and the bead portions 22). The side covering layers 32B are adhered to the outside face of the tire frame member 20 through an adhesive 54 (or a rubber cement composition). Prior to coating with the adhesive 54, the outside face of the tire frame member 20 or back faces of the side covering layers 32B are subjected to buffing or the like, similarly to as described above. Note that symbols, text, numbers, and the like indicating the name of the maker, product name, tire size, and the like are provided on an outer face of the side covering layers 32B.

The entire outer face of the tire frame member 20 on which the tread layer 30 and the side covering layers 32B are disposed is covered by an envelope, not illustrated in the drawings, and the tire frame member 20 is assembled to a pair of annular support members with a structure similar to that of a rim so as to form a temporary assembly. Tire radial direction inner side edges of the envelope are sandwiched between the bead portions 22 and flanges of the support members. Moreover, the grooves 30A of the tread layer 30 are temporarily filled in with a pressed-on material formed from an elastic body of rubber or the like. The pressed-on material is removed after vulcanization. The envelope is a covering member made from rubber, and is airtight and elasticated, as well as being thermally and chemically stable, and has appropriate strength. In the present exemplary embodiment, butyl rubber is employed for the envelope. The envelope is provided with a valve, not illustrated in the drawings, and the valve is configured connected to a vacuum device, not illustrated in the drawings. The vacuum device creates a vacuum inside the envelope, such that the envelope creates a force pressing the tread layer 30 and the side covering layers 32B toward the tire frame member 20 side.

Next, the temporary assembly is transported into a vulcanizing apparatus, not illustrated in the drawings. The temporary assembly is applied with heat and pressure inside the vulcanizing apparatus, thereby vulcanizing the temporary assembly. The temporary assembly configures a substantially completed pneumatic tire 10 when vulcanized. Following vulcanization, the envelope and the support members are removed.

Next, in the pneumatic tire 10, as illustrated in FIG. 1 to FIG. 3, the sound-absorbing material 44 is attached to the attachment region 40 at the inner circumferential surface of the tire frame member 20 using the attachment section 42. More specifically, the sound-absorbing material 44 is compressed in the tire width direction, and in this state, slotted between the first projecting wall 42A and the second projecting wall 42B. The recovery force of the sound-absorbing material 44 retains the sound-absorbing material 44 between the first projecting wall 42A and the second projecting wall 42B. When an adhesive is employed, the adhesive is coated onto the attachment region 40 in advance before attaching the sound-absorbing material 44 to the attachment region 40. The sound-absorbing material 44 is then adhered to the attachment region 40 through the adhesive.

When the above processing sequence has been completed, the pneumatic tire 10 according to the present exemplary embodiment illustrated in FIG. 1 to FIG. 3 is complete.

Operation and Advantageous Effects of the Present Exemplary Embodiment

As illustrated in FIG. 1 to FIG. 3, in the pneumatic tire 10 according to the present exemplary embodiment, the tire frame member 20 is made from a resin. The attachment section 42 is provided at the inner face of the tire frame member 20.

Note that the sound-absorbing material 44 can be easily attached inside the tire frame member 20 due to providing the attachment section 42. Accordingly, by attaching the sound-absorbing material 44 inside the tire frame member 20, the sound-absorbing material 44 is capable of reducing cavity resonance noise.

Moreover, in the pneumatic tire 10 according to the present exemplary embodiment, the sound-absorbing material 44 is attached inside the tire frame member 20, such that the sound-absorbing material 44 is capable of reducing cavity resonance noise.

Moreover, in the pneumatic tire 10 according to the present exemplary embodiment, as illustrated in FIG. 1 to FIG. 3, the attachment section 42 is configured by the plural projecting walls of the first projecting wall 42A and the second projecting wall 42B. The first projecting wall 42A and the second projecting wall 42B project out from the inner circumferential surface of the tire frame member 20 toward the tire radial direction inner side, and are separated from each other in the tire width direction. Note that as illustrated in FIG. 3, the separation distance L1 between the first projecting wall 42A and the second projecting wall 42B is greater than the projection height H of at least the first projecting wall 42A or the second projecting wall 42B. In other words, the projection height H of at least the first projecting wall 42A or the second projecting wall 42B from the inner circumferential surface of the tire frame member 20 is low. Accordingly, for example, in an operation to fit the pneumatic tire 10 to the wheel 14, or an operation to replace the pneumatic tire 10, contact between a tire lever 72, partially illustrated by single-dotted dashed lines in FIG. 1, and the first projecting wall 42A and the second projecting wall 42B, can be avoided, enabling damage to the attachment section 42 or the sound-absorbing material 44 to be suppressed.

Moreover, in the pneumatic tire 10 according to the present exemplary embodiment, the belt-shaped sound-absorbing material 44 is slotted between the first projecting wall 42A and the second projecting wall 42B. Note that the width dimension L2 of the sound-absorbing material 44 is set greater than the separation dimension L1 between the first projecting wall 42A and the second projecting wall 42B. Accordingly, the sound-absorbing material 44 can be easily slotted between the first projecting wall 42A and the second projecting wall 42B owing to the recovery force of the sound-absorbing material 44 after compressing (squeezing) the sound-absorbing material 44 in the width direction. Moreover, in the pneumatic tire 10 according to the present exemplary embodiment, the attachment section 42 is formed integrally to the tire frame member 20, thereby enabling a reduction in the number of components, and enabling configuration with a simple structure.

Second Exemplary Embodiment

Figure 4:
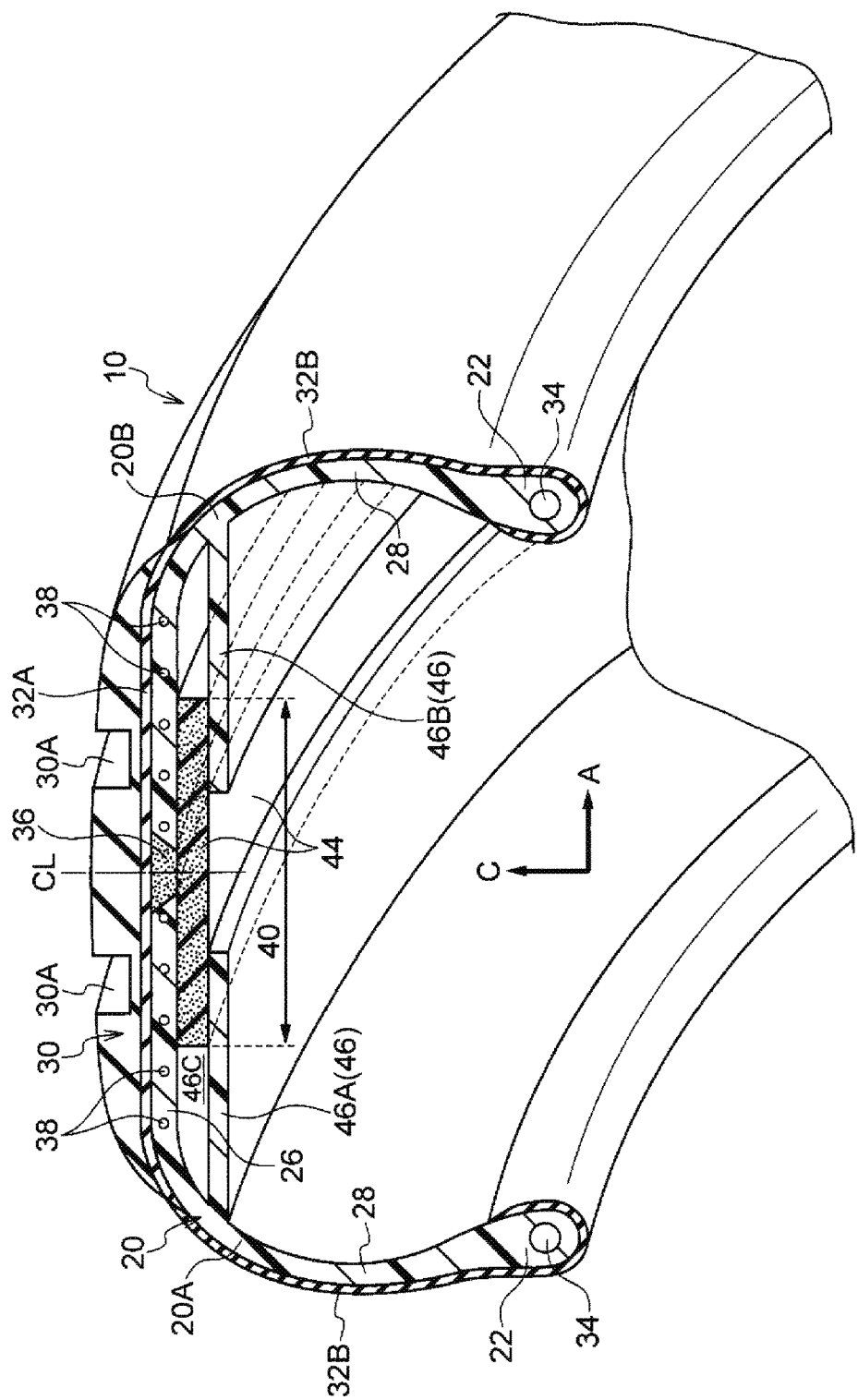
FIG. 4 is a perspective view corresponding to FIG. 2, illustrating a pneumatic tire according to a second exemplary embodiment of the present invention.
Figure 5:
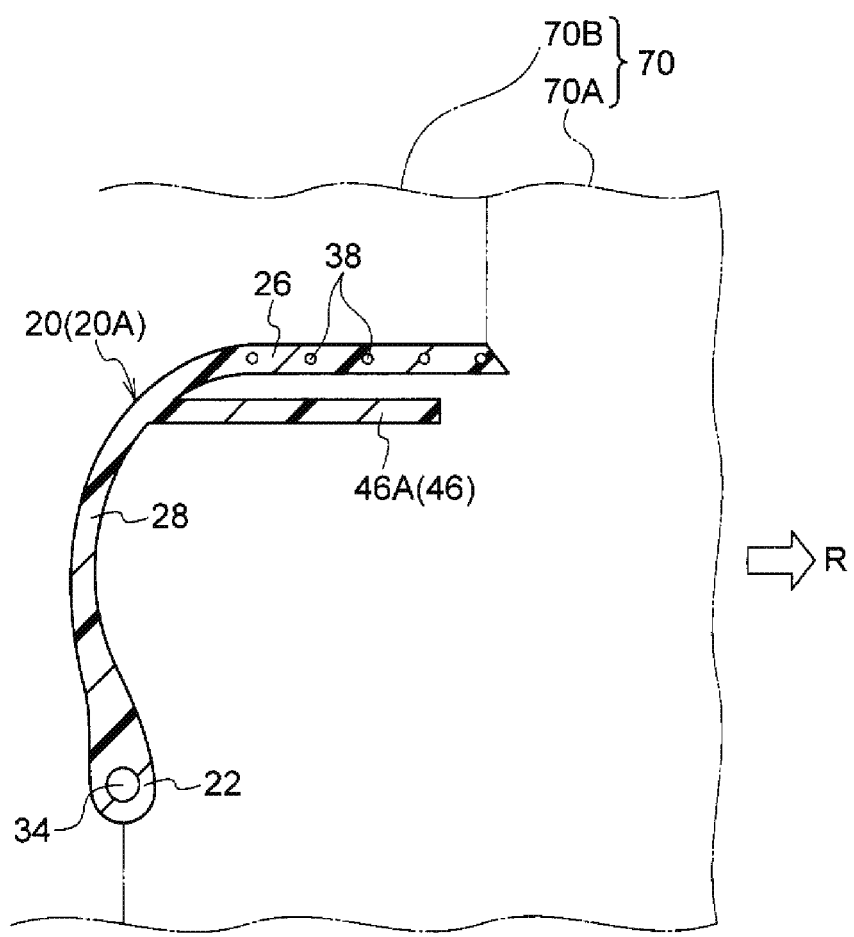
FIG. 5 is a cross-section outlining a portion of a tire frame member of the pneumatic tire illustrated in FIG. 4, and a resin-molding mold employed when molding the pneumatic tire.
Figure 6:
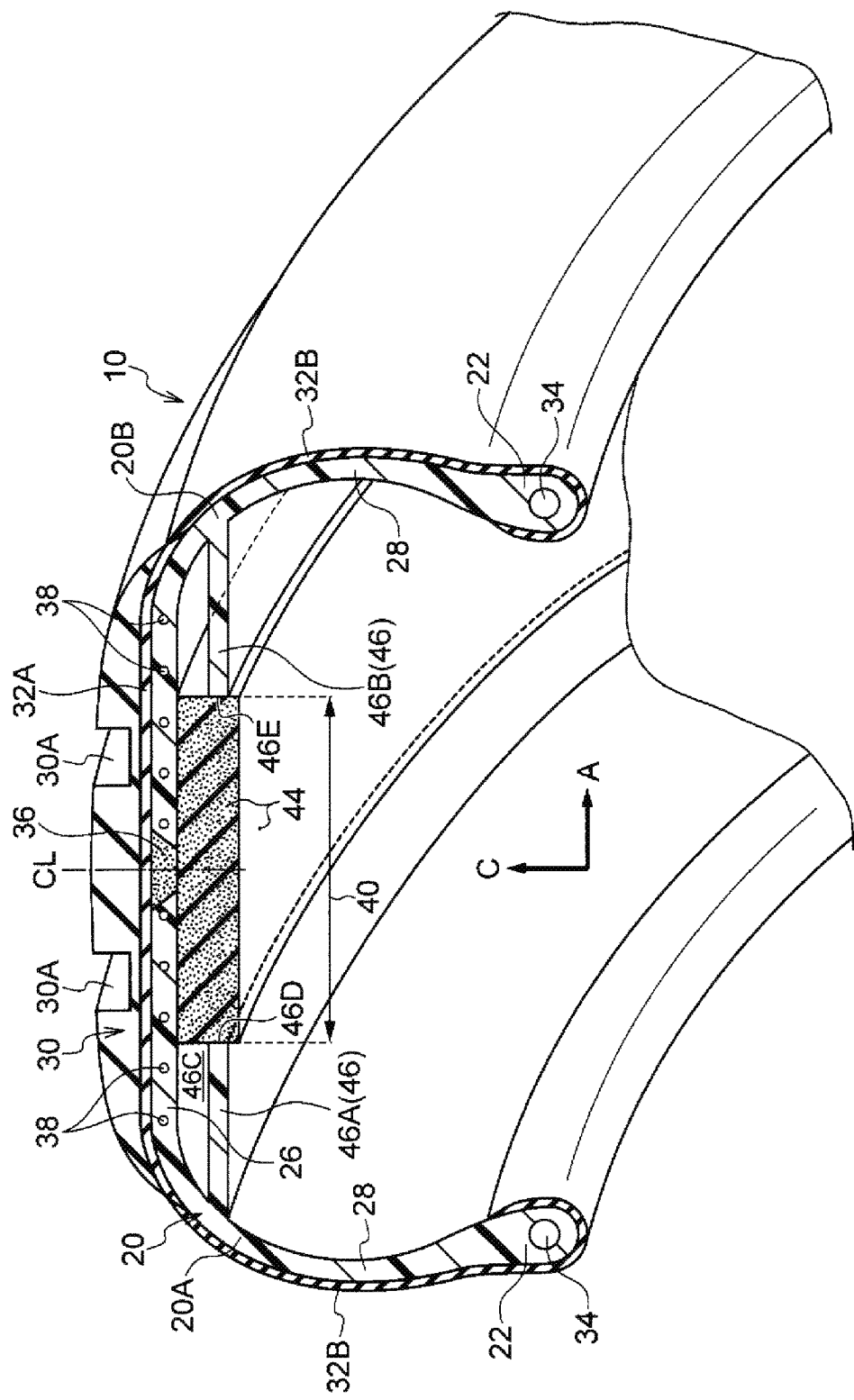
FIG. 6 is a perspective view corresponding to FIG. 4, illustrating a pneumatic tire according to a modified example of the second exemplary embodiment.

Explanation follows regarding a pneumatic tire according to a second exemplary embodiment of the present invention, with reference to FIG. 4 to FIG. 6. Note that in the present exemplary embodiment, and in a third exemplary embodiment of the present invention, described later, configuration the same as or equivalent to that of the pneumatic tire 10 according to the first exemplary embodiment described above is allocated the same reference numerals, and duplicate explanation thereof is omitted.

Attachment Section Configuration

As illustrated in FIG. 4, a pneumatic tire 10 according to the present exemplary embodiment includes an attachment section 46 that differs in configuration to the attachment section 42 of the pneumatic tire 10 according to the first exemplary embodiment. Specifically, the attachment section 46 is configured by a pair of (plural) projecting walls: a first projecting wall 46A and a second projecting wall 46B provided at the inner face of the tire frame member 20. The first projecting wall 46A projects out from the side wall portion 28 of the half-frame member 20A of the tire frame member 20 toward the tire width direction inner side, and is provided around the entire circumferential direction. The cross-section profile of the first projecting wall 46A is a long, thin, rectangular shape as viewed along a radial direction, such that the first projecting wall 46A configures a plate shaped part with its length running in the circumferential direction. The first projecting wall 46A is molded integrally to the half-frame member 20A, and is made of resin, similarly to the half-frame member 20A. The second projecting wall 46B projects out from the side wall portion 28 of the half-frame member 20B toward the tire width direction inner side, and is provided around the entire circumferential direction. The second projecting wall 46B has a long, thin, rectangular shape, similarly to the first projecting wall 46A, thereby configuring a plate shaped part. Moreover, the second projecting wall 46B is made from a resin, and is molded integrally to the half-frame member 20B. An attachment space 46C into which the sound-absorbing material 44 is slotted is formed between the first projecting wall 46A, the second projecting wall 46B, and the crown portion 26.

Similarly to the first projecting wall 42A and the second projecting wall 42B of the first exemplary embodiment described above, the cross-section profiles of the first projecting wall 46A and the second projecting wall 46B are not limited to rectangular shapes. Moreover, the first projecting wall 46A and the second projecting wall 46B may be provided intermittently, and the intermittence pitch of the first projecting wall 46A may be different from the intermittence pitch of the second projecting wall 46B. Moreover, configuration may be made in which either one out of the first projecting wall 46A or the second projecting wall 46B is provided continuously, and the other is provided intermittently.

Sound-Absorbing Material Configuration

The sound-absorbing material 44 has the same configuration as the sound-absorbing material 44 of the first exemplary embodiment. As illustrated in FIG. 4, a vehicle width direction outer side edge of the sound-absorbing material 44 is slotted into the attachment space 46C between the crown portion 26 of the tire frame member 20 and the first projecting wall 46A. As viewed along a radial direction, the first projecting wall 46A configures a cantilever beam with a support point at a location where the first projecting wall 46A is molded integrally to the side wall portion 28, thereby permitting appropriate flexing at the free end on the tire width direction inner side. Since the sound-absorbing material 44 itself has appropriate elastic properties, the sound-absorbing material 44 can be slotted in easily. The other edge on the vehicle width direction inner side of the sound-absorbing material 44 is slotted into the attachment space 46C between the crown portion 26 and the second projecting wall 46B of the half-frame member 20B. Similarly to the first projecting wall 46A, the second projecting wall 46B also configures a cantilever beam, enabling the sound-absorbing material 44 to be slotted in easily. In this manner, the sound-absorbing material 44 is attached to the inner face of the tire frame member 20 using the attachment section 46. Note that in addition to being slotted in, the sound-absorbing material 44 may be adhered to the attachment region 40 or to the first projecting wall 46A and the second projecting wall 46B using an adhesive.

Resin-Molding Mold Configuration

Simple explanation now follows regarding a resin-molding mold 70 employed when molding the half-frame member 20A of the tire frame member 20, with reference to FIG. 5. The resin-molding mold 70 is configured by a first mold 70A and a second mold 70B, and the half-frame member 20A is molded inside a cavity formed by the first mold 70A and the second mold 70B. As described above, the first projecting wall 46A molded integrally to the half-frame member 20A is formed with a cross-section profile projecting out in the tire width direction, and extends in the same direction as the crown portion 26. Namely, a removal direction R of the first projecting wall 46A from the first mold 70A is the same as the removal direction R of the crown portion 26 from the first mold 70A. Note that the half-frame member 20B of the tire frame member 20 and the second projecting wall 46B of the attachment section 46 are formed using a similar resin-molding mold.

Operation and Advantageous Effects of the Present Exemplary Embodiment

The pneumatic tire 10 according to the present exemplary embodiment is capable of obtaining similar operation and advantageous effects to the operation and advantageous effects obtained by the pneumatic tire 10 according to the first exemplary embodiment.

Moreover, in the pneumatic tire 10 according to the present exemplary embodiment, the attachment section 46 is formed projecting out toward the tire width direction inner side from the side wall portions 28 of the tire frame member 20. Accordingly, the projection direction of the attachment section 46 is the same as the projection direction of the crown portion 26 of the tire frame member 20. The removal direction R of the resin-molding mold 70 for molding the tire frame member 20 is therefore the same for both the crown portion 26 and the attachment section 46, thereby enabling the attachment section 46 to be molded at the same time as, and integrally to, the tire frame member 20.

Modified Example

As illustrated in FIG. 6, a pneumatic tire 10 according to a modified example of the second exemplary embodiment is configured such that the sound-absorbing material 44 is slotted between the first projecting wall 46A and the second projecting wall 46B in the attachment region 40.

To be slightly more specific, the sound-absorbing material 44 is slotted between an edge 46D on the second projecting wall 46B side of the first projecting wall 46A, and an edge 46E on the first projecting wall 46A side of the second projecting wall 46B.

Note that similarly to the relationship between the separation dimension L1 and the width dimension L2 in the pneumatic tire 10 according to the first exemplary embodiment illustrated in FIG. 3, a width dimension of the sound-absorbing material 44 in the tire width direction is set greater than a separation dimension between the edge 46D of the first projecting wall 46A and the edge 46E of the second projecting wall 46B. Moreover, the sound-absorbing material 44 may be adhered to the attachment region 40 using an adhesive in addition to being slotted in.

The pneumatic tire 10 according to the modified example of the present exemplary embodiment is capable of obtaining similar operation and advantageous effects to the operation and advantageous effects obtained by the pneumatic tire 10 according to the second exemplary embodiment.

Third Exemplary Embodiment

Figure 7:
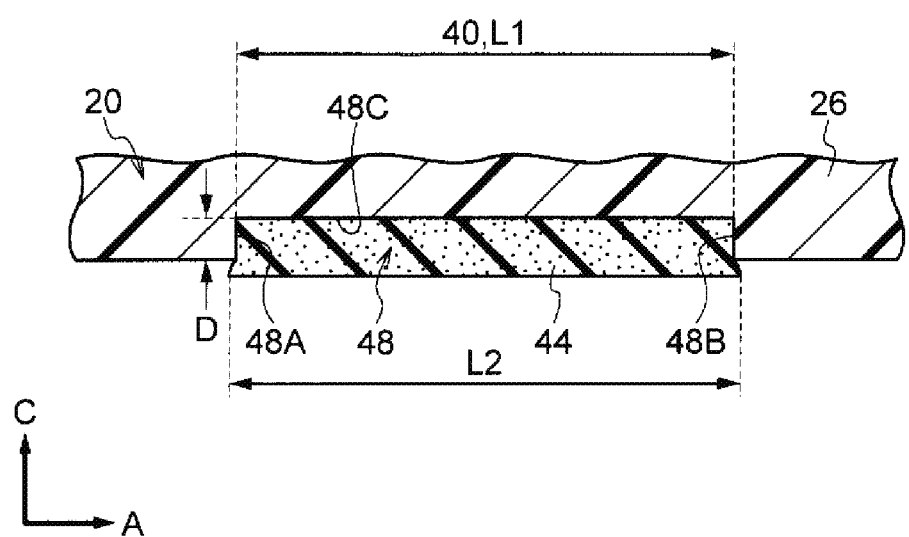
FIG. 7 is an enlarged cross-section as viewed along a radial direction, illustrating relevant portions of a pneumatic tire according to a third exemplary embodiment of the present invention.

Explanation follows regarding a pneumatic tire according to a third exemplary embodiment of the present invention, with reference to FIG. 7.

Attachment Section Configuration

As illustrated in FIG. 7, a pneumatic tire 10 according to the present exemplary embodiment includes an attachment section 48 that differs in configuration to the attachment section 42 of the pneumatic tire 10 according to the first exemplary embodiment. Specifically, the attachment section 48 is configured by a recess that is sunken toward the tire radial direction outer side in the inner circumferential surface of the tire frame member 20, and that is provided around the entire circumferential direction or intermittently around the circumferential direction. Note that the attachment section 48 may be provided at the crown portion 26 at a tire width direction intermediate portion of the tire frame member 20, or may be provided at the respective crown portions 26 of the half-frame member 20A and the half-frame member 20B.

The recess of the attachment section 48 includes a side wall 48A and a side wall 48B that face each other in the tire width direction, and a bottom face 48C that configures the attachment region 40 of the tire frame member 20. A separation dimension (width direction of the attachment section 48) L1 between the side wall 48A and the side wall 48B of the attachment section 48 in the tire width direction is the same as the width dimension of the attachment region 40. A depth D of the attachment section 48 corresponds to a dimension from the inner circumferential surface of the tire frame member 20 to the bottom face 48C. In other words, if the bottom face 48C is taken as a reference, the depth D corresponds to a projection height of the side wall 48A and the side wall 48B of the attachment section 48 toward the tire radial direction inner side. The belt-shaped sound-absorbing material 44 having a width dimension L2 set greater than the separation dimension L1 of the attachment section 48 is slotted into the attachment section 48.

Note that in the present exemplary embodiment, a plan view shape (recess opening shape) of the attachment section 48 as viewed from the radial direction inner side toward the radial direction outer side of the tire frame member 20 is configured in a rectangular shape; however, there is not necessarily any limitation to this shape. For example, the plan view shape of the attachment section 48 may be configured by geometric shapes such as circular shapes, elliptical shapes, or polygonal shapes provided continuously, or regularly arrayed, around the circumferential direction.

Operation and Advantageous Effects of the Present Exemplary Embodiment

The pneumatic tire 10 according to the present exemplary embodiment is capable of obtaining similar operation and advantageous effects to the operation and advantageous effects obtained by the pneumatic tire 10 according to the first exemplary embodiment.

In the pneumatic tire 10 according to the present exemplary embodiment, the attachment section 48 is configured by a recess sunken toward the tire radial direction outer side in the inner circumferential surface of the tire frame member 20. The separation dimension L1 of the attachment section 48 is greater than the depth D of the attachment section 48. In other words, the depth D of the attachment section 48 is shallow. Accordingly, for example as illustrated in FIG. 1, described above, in an operation to fit the pneumatic tire 10 to the wheel 14, or in an operation to replace the pneumatic tire 10, contact between the tire lever 72 and the attachment section 48 can be avoided, enabling damage to the attachment section 48 or the sound-absorbing material 44 to be suppressed.

Moreover, in the pneumatic tire 10 according to the present exemplary embodiment, the belt-shaped sound-absorbing material 44 is slotted into the recess configuring the attachment section 48. Note that the width dimension L2 of the sound-absorbing material 44 is greater than the separation dimension L1 of the attachment section 48. Accordingly, the sound-absorbing material 44 can be easily slotted into the attachment section 48 owing to the recovery force of the sound-absorbing material 44 after compressing (squeezing) the sound-absorbing material 44 in the width direction.

Other Exemplary Embodiments

Explanation has been given regarding the present invention based on the exemplary embodiments described above. However, the present invention is not limited to the above exemplary embodiments, and various modifications may be implemented within a range not departing from the spirit of the present invention. For example, in the present invention, an attachment section may be provided at the side wall portions of the tire frame member, and a sound-absorbing material may be attached to the side wall portions using the attachment section. Moreover, in the present invention, a first projecting wall may be provided at the crown portion of the tire frame member and second projecting walls may be provided at the side wall portions, and the sound-absorbing material may be slotted between the first projecting wall and the second projecting walls.

Moreover, in the exemplary embodiments described above, the attachment section is molded integrally to the tire frame member. However, in the present invention, the attachment section may be provided integrally to the tire frame member using an adhesive or the like.

10 pneumatic tire
20 tire frame member
22 bead portion
26 crown portion
28 side wall portion
30 tread layer
32A cushioning rubber
32B side covering layer
40 attachment region
42, 46, 48 attachment section
42A, 46A first projecting wall
42B, 46B second projecting wall
sound-absorbing material

The invention claimed is:

1. A pneumatic tire comprising:
a tire frame member that is made from a resin; and
an attachment section that is provided at an inner face of the tire frame member and configured such that a sound-absorbing material capable of absorbing sound is attachable to the attachment section,
wherein the tire frame member comprises:
a first half-frame member comprising a first tire width direction center side edge; and
a second half-frame member comprising a second tire width direction center side edge, the first and second half-frame members being symmetrical about a tire equatorial plane, and the first and second tire width direction center side edges being bonded together by a bonding material,
wherein the attachment section is configured by projecting walls that project out from side wall portions of the tire frame member toward a tire width direction inner side, and
wherein the projecting walls are configured to extend in the same direction as a crown portion that is provided at an outer circumferential surface of the tire frame member.

2. The pneumatic tire of claim 1, wherein a sound-absorbing material capable of absorbing sound is attached to the attachment section.

3. The pneumatic tire of claim 1, wherein the attachment section is integrally molded with the tire frame member.

4. The pneumatic tire of claim 1, wherein both end portions of a sound-absorbing material capable of absorbing sound are slotted into an attachment space between a crown portion of the tire frame member and the projecting walls.

5. The pneumatic tire of claim 1, wherein:
a sound-absorbing material capable of absorbing sound is slotted between tire width direction inner side end portions of the projecting walls; and
the sound-absorbing material has a greater width dimension than a dimension between the tire width direction inner side end portions of the projecting walls.

* * * * *